United States Patent
Delbridge et al.

(10) Patent No.: US 7,284,719 B2
(45) Date of Patent: Oct. 23, 2007

(54) SPICE GRINDER

(76) Inventors: David Stephen Delbridge, 67 Wireless Road, Kommetjie 7976 (ZA); Patrick John Delbridge, 11 Caxton Way, Oakridge 7806 (ZA)

( * ) Notice: Subject to any disclaimer, the term of this patent is extended or adjusted under 35 U.S.C. 154(b) by 0 days.

(21) Appl. No.: 10/586,286

(22) PCT Filed: Nov. 11, 2004

(86) PCT No.: PCT/ZA2004/000141

§ 371 (c)(1),
(2), (4) Date: Jul. 13, 2006

(87) PCT Pub. No.: WO2005/046411

PCT Pub. Date: May 26, 2005

(65) Prior Publication Data

US 2006/0278746 A1    Dec. 14, 2006

(30) Foreign Application Priority Data

Nov. 14, 2003   (ZA) ................................ 2003/8880

(51) Int. Cl.
*A47J 42/00* (2006.01)
(52) U.S. Cl. ................................................. 241/169.1
(58) Field of Classification Search ............... 241/168, 241/169.1
See application file for complete search history.

(56) References Cited

U.S. PATENT DOCUMENTS

| | | | |
|---|---|---|---|
| 3,371,874 A * | 3/1968 | Reeves et al. ........... | 241/169.1 |
| 5,176,329 A | 1/1993 | De Coster et al. | |
| 6,443,377 B1 * | 9/2002 | Cheng ...................... | 241/169.1 |
| 6,948,672 B2 * | 9/2005 | Herren ..................... | 241/169.1 |
| 2002/0117566 A1 | 8/2002 | Cheng | |
| 2002/0117567 A1 * | 8/2002 | Lee et al. ................. | 241/169.1 |

FOREIGN PATENT DOCUMENTS

| | | |
|---|---|---|
| CH | 351 726 A | 1/1961 |
| DE | 203 04 793 U1 | 7/2003 |

* cited by examiner

*Primary Examiner*—Faye Francis
(74) *Attorney, Agent, or Firm*—Dalina Law Group, P.C.

(57) ABSTRACT

A spice grinder (12) comprising a first, static component (10) which includes threading (14) by means of which it can be screwed onto the threaded neck of a container and a second, rotatable component (16) which fits on the component (10). The first component (10) has a tapering bore with teeth (30) projecting inwardly from the surface of the bore. The second component (16) has a cone (44) with teeth (48) on the outside thereof. The teeth (48) are in the tapering bore whereby grinding takes place in the gap between the teeth of the first and second components upon the second component being rotated. The first and second component (10, 16) have interlocking circumferentially extending ribs and grooves (32, 50, 52) which permit the rotatable component (16) to be moved axially and located in its adjusted position thereby to vary the size of the gap between the teeth (30) of the rotatable component and the teeth (48) of the static component.

5 Claims, 4 Drawing Sheets

SPICE GRINDER

FIELD OF THE INVENTION

THIS INVENTION relates to spice grinders.

BACKGROUND TO THE INVENTION

Spice grinders are fitted to bottles containing spices such as peppercorns. Known grinders comprise a static element which has a central bore. An array of teeth project inwardly from the surface of the bore. Within the bore there is a rotatable element which has radially outwardly projecting vanes. Peppercorns or other spices are trapped between the vanes and the teeth and ground into a powder when the rotatable element is turned. The powder then falls from the grinder.

In one form of grinder known to Applicant, there is a cam which, when rotated, shifts the rotatable element axially with respect to the static element. In this form the bore of the static element is conical, axial movement of the rotatable element varying the size of the gap between the two components and thus varying the particle size to which the spices are ground.

The present invention seeks to provide an adjustable form of spice grinder which is simpler in construction than the one described above.

BRIEF DESCRIPTION OF THE INVENTION

According to the present invention there is provided a spice grinder comprising a first, static component which includes means by which it can be attached to the neck of a container, a second, rotatable component which fits on the first component, the first component having a tapering bore with teeth projecting inwardly from the surface of the bore and the second component having a toothed portion thereof in said bore whereby grinding takes place in the gap between the teeth of the first and second components upon the second component being rotated with respect to the first component, said first and second components having interlocking circumferentially extending ribs and grooves which permit the rotatable second component to be moved axially with respect to the static first component and located in its adjusted position thereby to vary the spacing between the teeth of the rotatable component and the teeth of the static component.

The second component of the spice grinder can include a spider comprising spokes with openings therebetween and a cone which constitutes the centre of the spider, the spokes extending outwardly from the cone, and the teeth of the second component being on the outer surface of the cone.

Preferably there are four equally spaced teeth on the outer surface of the cone.

The teeth of the first component are, in one embodiment, on the inner surface of a tapering sleeve.

In a specific constructional form the teeth of the first component are in the form of raised ribs extending along said inner surface, each rib being bounded by two intersecting surfaces of unequal width whereby, in axial view, said inner surface is of serrated form.

BRIEF DESCRIPTION OF THE DRAWINGS

For a better understanding of the present invention, and to show how the same may be carried into effect, reference will now be made, by way of example, to the accompanying drawings in which.

DETAILED DESCRIPTION OF THE DRAWINGS

Figure 1:
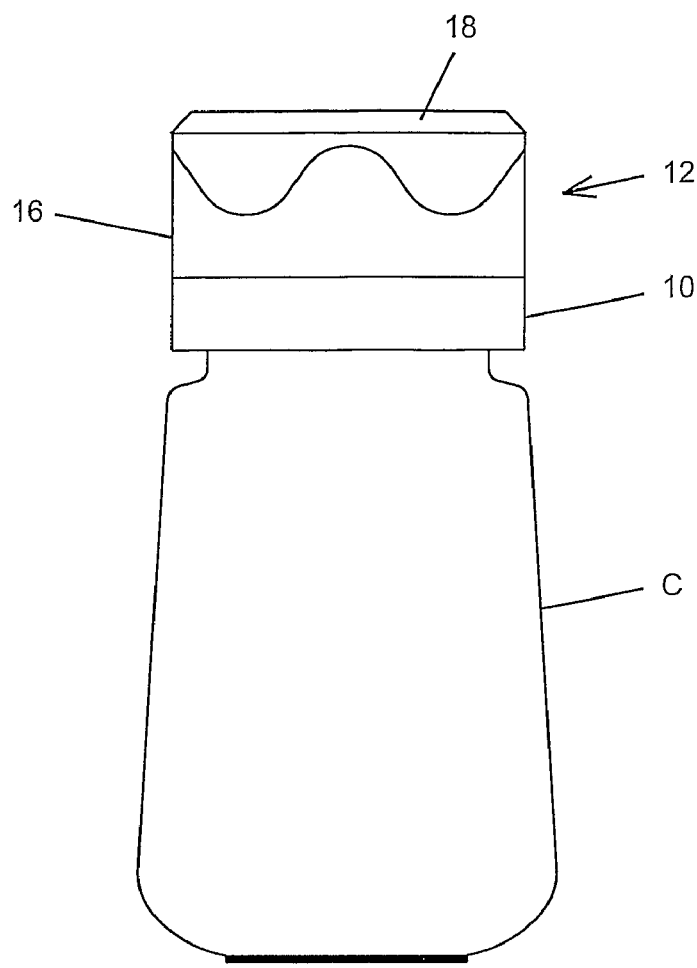
FIG. 1 is a side elevation of a bottle containing peppercorns or other spices and having a grinder fitted thereto.
Figure 4:
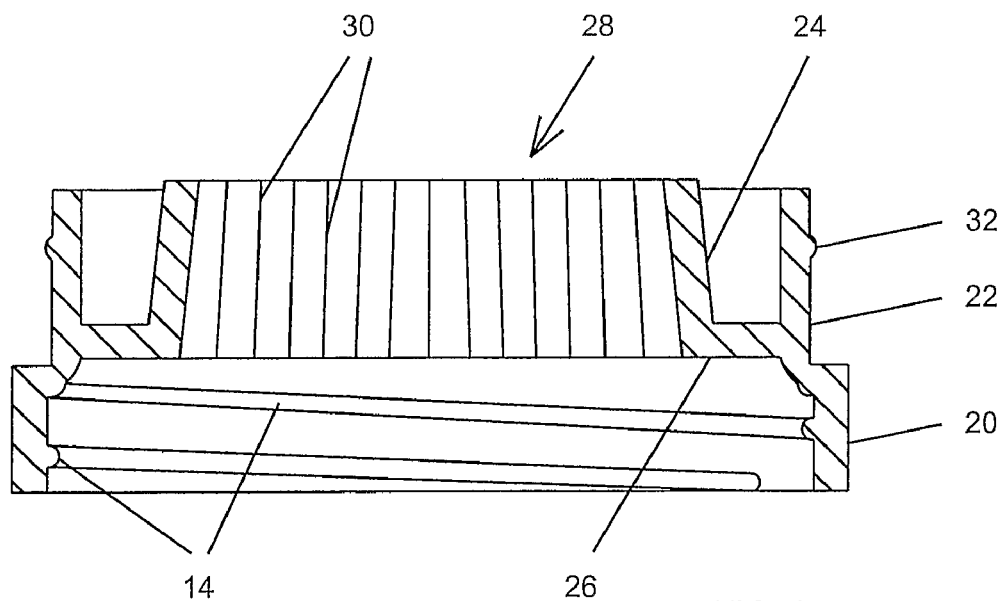
FIG. 4 is a diametral section through the component of FIGS. 2 and 3.

A container C (FIG. 1), usually in the form of a glass bottle, has the static component 10 of a spice grinder 12 screwed onto it by means of the compatible external spiral threading (not shown) on the neck of the container C and the internal spiral threading 14 (FIGS. 4 and 8) of the component 10. The rotatable component of the spice grinder is designated 16. A loose cap 18 is provided, this being a press fit in the open upper end of the component 16. The cap is configured so that it can readily be prised out of the component 16 and refitted.

Figure 2:
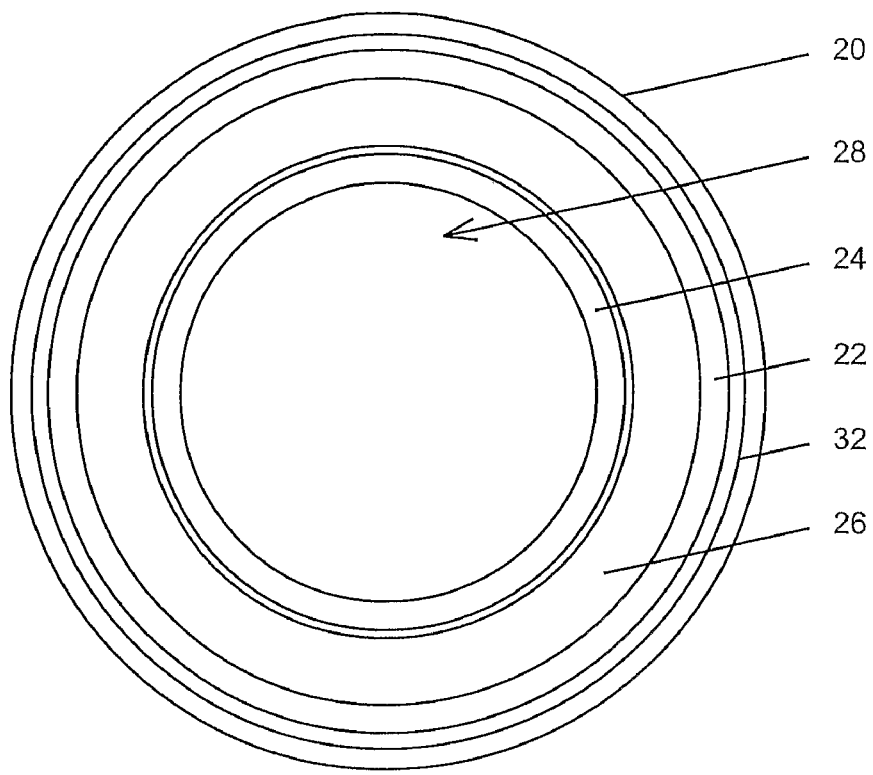
FIG. 2 is a top plan view of one of the two components of the spice grinder.
Figure 3:
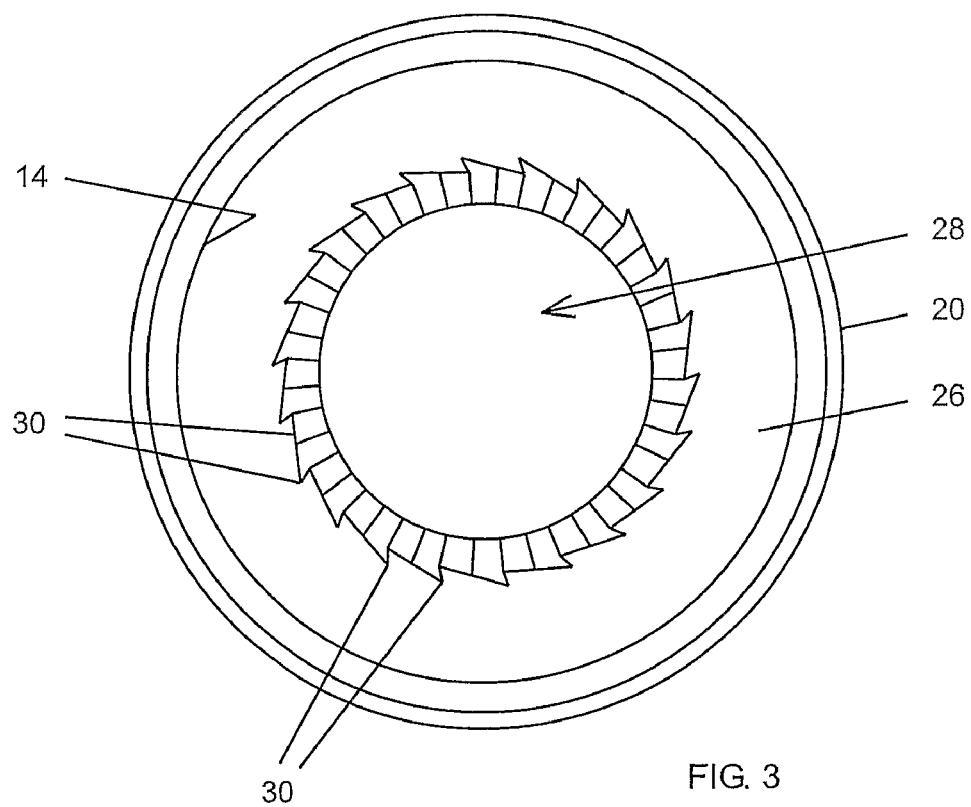
FIG. 3 is an underneath view of the component of FIG. 2.

The component 10 (FIGS. 2, 3 and 4) includes a skirt 20 which screws onto the neck of the bottle. The threading 14 is formed on the inside of the skirt 20. The component 10 is stepped externally, the skirt 20 being below the step and there being an external sleeve 22 and an internal tapering sleeve 24 above the step. A circumferentially extending web 26 joins the sleeves 22 and 24 at their lower ends. The sleeve 24 has a conical bore 28 and teeth 30 protrude inwardly from the surface of the bore 28. Each tooth 30 is in the form of a rib which extends along the surface of the sleeve 24. Each rib is bounded by two intersecting surfaces of unequal width. Thus, in axial view (FIG. 3) the inner surface of the sleeve 24 is of serrated form.

On the external surface of the component 10 there is a circumferentially extending rib 32.

Figure 5:
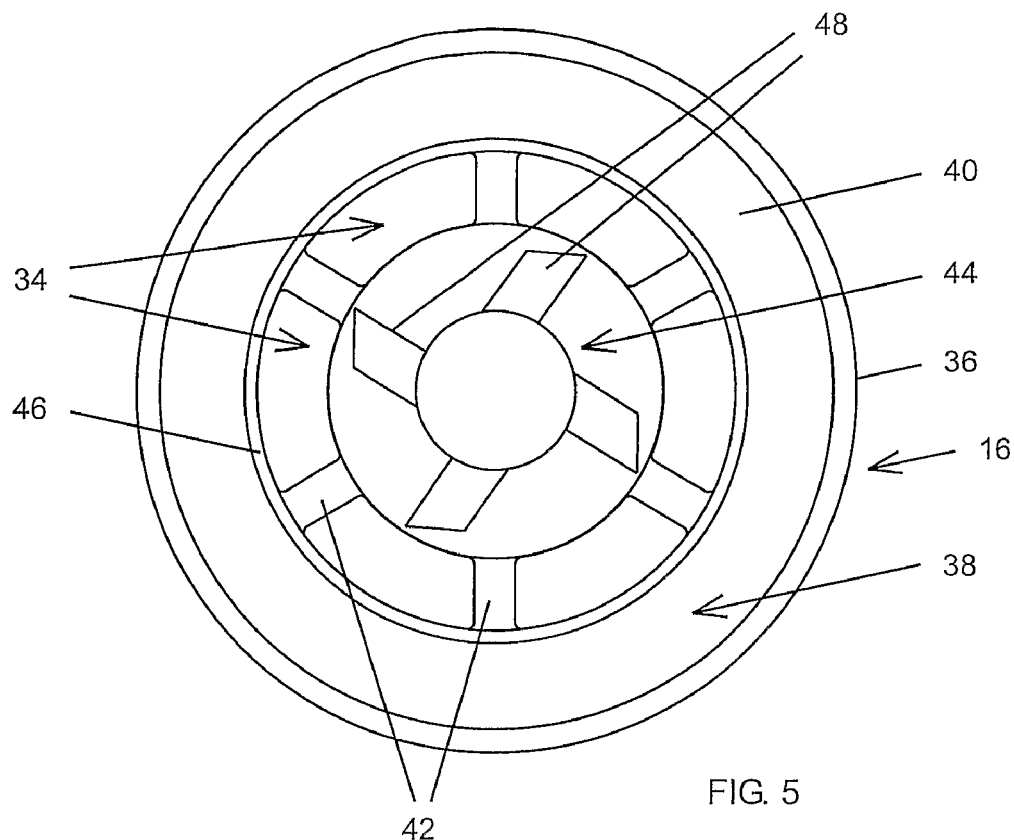
FIG. 5 is an underneath view of the other of the two components of the spice grinder of FIG. 1.
Figure 6:
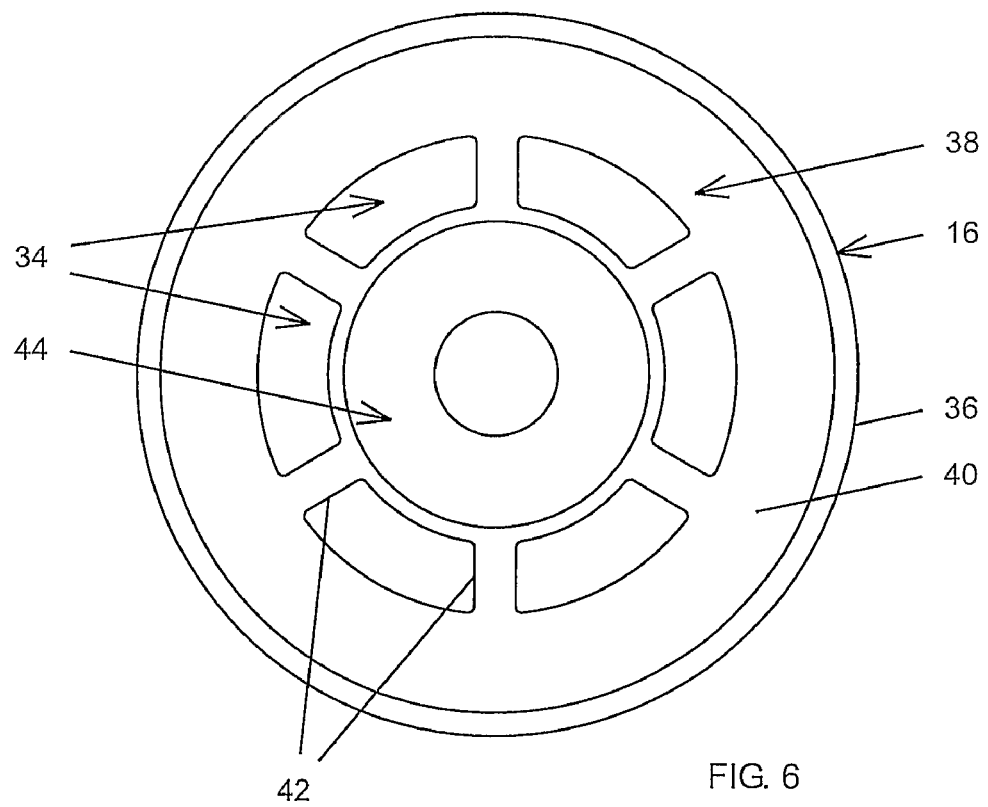
FIG. 6 is a top plan view of the component of FIG. 5.
Figure 7:
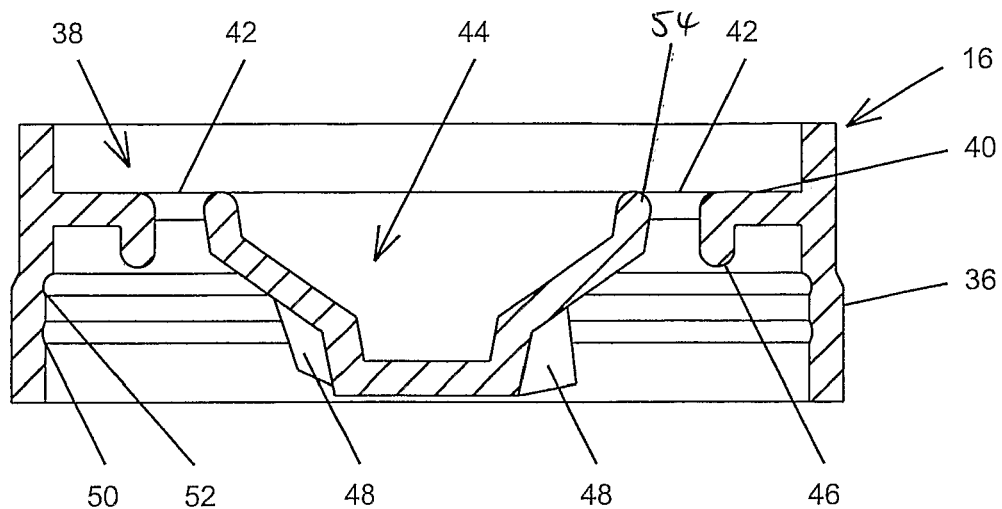
FIG. 7 is a diametral section through the component of FIGS. 5 and 6.

The rotatable component 16 (FIGS. 5, 6 and 7) comprises an outer skirt 36 and a spider 38. The spider 38 includes an outer ring 40, radial spokes 42 and a cone 44 forming the centre of the spider. A flange 46 depends from the inner periphery of the ring 40. The openings between the spokes 42 are designated 34.

The cone 44 is closed at its lower end and joined, at its upper end, to the ring 40 by the spokes 42 which extend outwardly from the cone 44. On the outside of the cone 44 there are four equally spaced protruding teeth 48 (see particularly FIG. 5).

Two parallel internal grooves 50, 52 are provided on the inner cylindrical face of the skirt 36.

Figure 8:
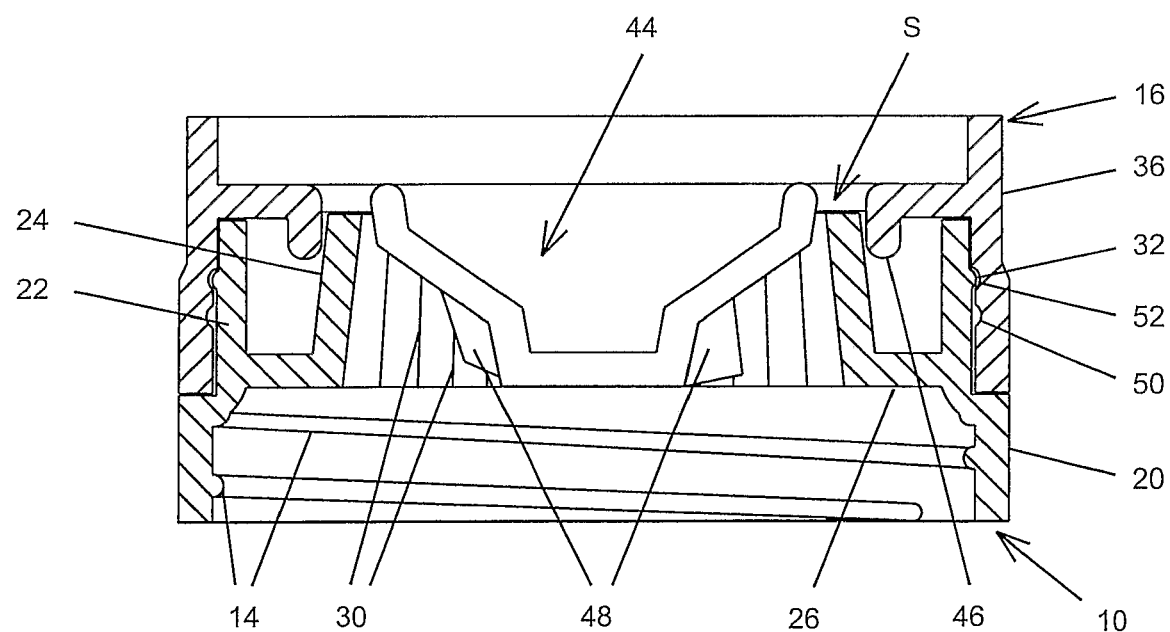
FIG. 8 is a section through the assembled spice grinder.

As shown in FIG. 8, the sleeve 22 fits in the sleeve 36, the rib 32 snapping into one or other of the grooves 50, 52 depending on how far the sleeve 22 is pushed into the sleeve 36.

There are grinding gaps between the tips of the teeth 48 and the array of teeth 30.

When the grinder is inverted from the position shown in FIG. 8, peppercorns drop in the gap between the cone 44 and the sleeve 24. As the component 12 is rotated on the component 10, the teeth 30, 48 grind the peppercorns between them. The fragments drop out of the grinder through the series of slits S between the inner edge of the sleeve 24 and the widest part of the cone 44. The slits S register with the radially inner parts of the openings 34.

The surface of the cone designated 54 has thereon a series of axially extending ribs which co-operate with the parts of the teeth 30 which are at the smaller diameter end of the bore 28 and act as a fine grinding structure. The teeth 48 and teeth 30 together form a coarse grinder structure.

If the component 16 is pulled up from the position shown in FIG. 8 so that the rib 32 leaves the groove 52 and snaps into the groove 50, the teeth on the surface 54 move away from the teeth 30. The peppercorns thus only have to be ground to a larger particle size before they fall through the slits S.

The invention claimed is:

1. A spice grinder comprising:
   a first static component which includes means by which said first static component can be attached to a neck of a container wherein said first static component includes a first set of teeth;
   a second rotatable component which fits on said first static component wherein said second rotatable component includes a second set of teeth;
   said first static component forming a tapering bore between said first set of teeth projecting inwardly from a surface of said first static component and said second set of teeth projecting inwardly from said second rotatable component;
   said second rotatable component having said second set of teeth thereof in said tapering bore wherein grinding takes place in a gap between said first set of teeth of said first static component and said second set of teeth of said second component upon said second rotatable component being rotated with respect to said first static component;
   said second rotatable component comprising a first circumferentially extending groove, a second circumferentially extending groove spaced axially from said first circumferentially extending groove and parallel thereto and said first static component comprising a circumferentially extending rib which, upon said first static component and said second rotatable component are displaced axially relatively to one another, which leaves said circumferentially extending groove in which it is seated and snaps into said second circumferentially extending groove and is located in an adjusted position to vary a spacing between said toothed portion of said second rotatable component and said teeth of the first static component.

2. The spice grinder as claimed in claim 1, wherein said second rotatable component includes a spider comprising spokes with openings therebetween and a cone which constitutes a center of said spider, said spokes extending outwardly from said cone, and said toothed portion of said second rotatable component being on an outer surface of said cone.

3. The spice grinder as claimed in claim 2, wherein said cone comprises four equally spaced teeth on said outer surface of said cone.

4. The spice grinder as claimed in claim 1 wherein said teeth of said first static component are on an inner surface of a tapering sleeve.

5. The spice grinder as claimed in claim 4, wherein said teeth of said first static component comprise raised ribs extending along said inner surface wherein each rib is bounded by two intersecting surfaces of unequal width wherein, in axial view, said inner surface is serrated.

* * * * *